(12) United States Patent
Trowbridge (10) Patent No.: US 9,389,872 B2
(45) Date of Patent: Jul. 12, 2016

(54) SOFTWARE WIZARD IMPLEMENTATION FRAMEWORK

(75) Inventor: David Trowbridge, Los Altos Hills, CA (US)

(73) Assignee: VMware, Inc., Palo Alto, CA (US)

( * ) Notice: Subject to any disclaimer, the term of this patent is extended or adjusted under 35 U.S.C. 154(b) by 44 days.

(21) Appl. No.: 13/422,083

(22) Filed: Mar. 16, 2012

(65) Prior Publication Data

US 2013/0247006 A1    Sep. 19, 2013

(51) Int. Cl.
*G06F 9/44*    (2006.01)

(52) U.S. Cl.
CPC .. *G06F 9/44* (2013.01); *G06F 8/38* (2013.01); *G06F 9/4446* (2013.01)

(58) Field of Classification Search
CPC ........ G06F 9/4443; G06F 8/38; G06F 9/4446
USPC .......................................................... 717/155
See application file for complete search history.

(56) References Cited

U.S. PATENT DOCUMENTS

| | | | | |
|---|---|---|---|---|
| 6,564,375 B1* | 5/2003 | Jiang | ..................... | G06F 9/4446 707/999.103 |
| 8,365,138 B2* | 1/2013 | Iborra | ....................... | G06F 8/30 717/104 |
| 2003/0137540 A1* | 7/2003 | Klevenz et al. | ................ | 345/762 |
| 2004/0199430 A1* | 10/2004 | Hsieh | ............................... | 705/26 |
| 2005/0228644 A1* | 10/2005 | Wang | ................... | G06F 9/45512 704/10 |
| 2006/0074967 A1* | 4/2006 | Shaburov | ....................... | 707/102 |
| 2009/0265686 A1* | 10/2009 | Lucas | ................... | G06F 9/4436 717/120 |
| 2010/0299619 A1* | 11/2010 | Rowlett | ................ | G06F 9/4446 715/760 |

OTHER PUBLICATIONS

Luna, "Introducing Usability Requirements in a Test/Model Driven Web Engineering Method", Jun. 2009; pp. 12.*
Memon, "An event-flow model of GUI-based applications for testing", Aug. 6, 2007, pp. 137-157.*
Gregor Engels, "Towards Model-Driven Unit Testing", Mar. 5, 2007, Springer Berlin, p. 182-192.*
VMware Workstation 5.5 Documentation, "Setting Up a New Virtual Machine," published by VMware, Inc. and accessible at http://www.vmware.com/support/ws55/doc/ws_newguest_setup_simple_steps.html, Nov. 6, 2008.

* cited by examiner

*Primary Examiner* — Duy Khuong Nguyen (57) ABSTRACT

A framework for developing and testing a software wizard formalizes, through constraint functions, relationships between different pages of the software wizard. A sequence of user interface (UI) pages of a software wizard is generated in accordance with this framework by carrying out the steps of displaying a first UI page that includes a first UI element for causing a transition to a next UI page of the software wizard, wherein the first UI page is associated with one or more constraint functions, detecting an input event that triggers the one or more constraint functions of the first UI page to produce an output that identifies the next UI page in the sequence of UI pages of the software wizard, and transitioning to the next UI page based on the output.

8 Claims, 8 Drawing Sheets

SOFTWARE WIZARD IMPLEMENTATION FRAMEWORK

BACKGROUND

In modern computing, software wizards are used to execute complex tasks that a user would otherwise need to carry out manually. For example, a software wizard is commonly used to perform an installation of a software package, which typically comprises a multitude of steps that would be tedious for the user to perform manually. A typical software wizard guides a user through a series of user interface (UI) pages that contain UI input elements through which the user makes decisions about how the complex task should be carried out. When the user has navigated through all of the UI pages, the software wizard executes the complex task in accordance with all of the inputs that the user has made.

Despite the prevalence of software wizards, the framework for developing and testing software wizards remains somewhat primitive. Many of the current techniques for developing and testing software wizards are still ad-hoc, and as a result, the process is very time-consuming. Software wizards that are developed and tested ad-hoc are also inflexible and vulnerable to errors resulting from an incomplete design.

It may be possible to address some of the issues with ad-hoc development and testing of software wizards by applying popular software paradigms, such as the model view controller (MVC) paradigm. Techniques employing MVC, however, are still flawed, because in MVC based approaches, there is not a natural way of modeling a fundamental behavior of software wizards—which is that most UI pages included in software wizards conceptually follow after another page. Moreover, explicit ordering for validation cannot be defined using MVC based approaches, which makes such approaches susceptible to the same problems as the ad-hoc techniques described above.

SUMMARY

Accordingly, disclosed herein is a framework for developing and testing a software wizard that formalizes, through constraint functions, relationships between different pages of the software wizard.

A method for generating a sequence of UI pages of a software wizard, according to an embodiment, includes the steps of displaying a first UI page that includes a first UI element for causing a transition to a next UI page of the software wizard, wherein the first UI page is associated with one or more constraint functions, detecting an input event that triggers the one or more constraint functions of the first UI page to produce an output that identifies the next UI page in the sequence of UI pages of the software wizard, and transitioning to the next UI page based on the output.

A method of guiding a user through a sequence of UI pages of a software wizard, according to an embodiment, includes the steps of displaying a first UI page having first and second UI elements, wherein an input made to the first UI element causes at least one constraint function to be executed and an input made to the second UI element causes a next UI page to be displayed, detecting an input made to the first UI element and executing the constraint function in response thereto to set the next UI page to be displayed, and detecting an input made to the second UI element and, in response thereto, displaying a second UI page as the next page if the detected input is of a first type and a third UI page as the next page if the detected input is of a second type.

Further embodiments of the present invention include, without limitation, a non-transitory computer-readable storage medium that includes instructions that enable a processing unit to implement the above method as well as a computer system configured to implement the above method.

DETAILED DESCRIPTION

Figure 1:
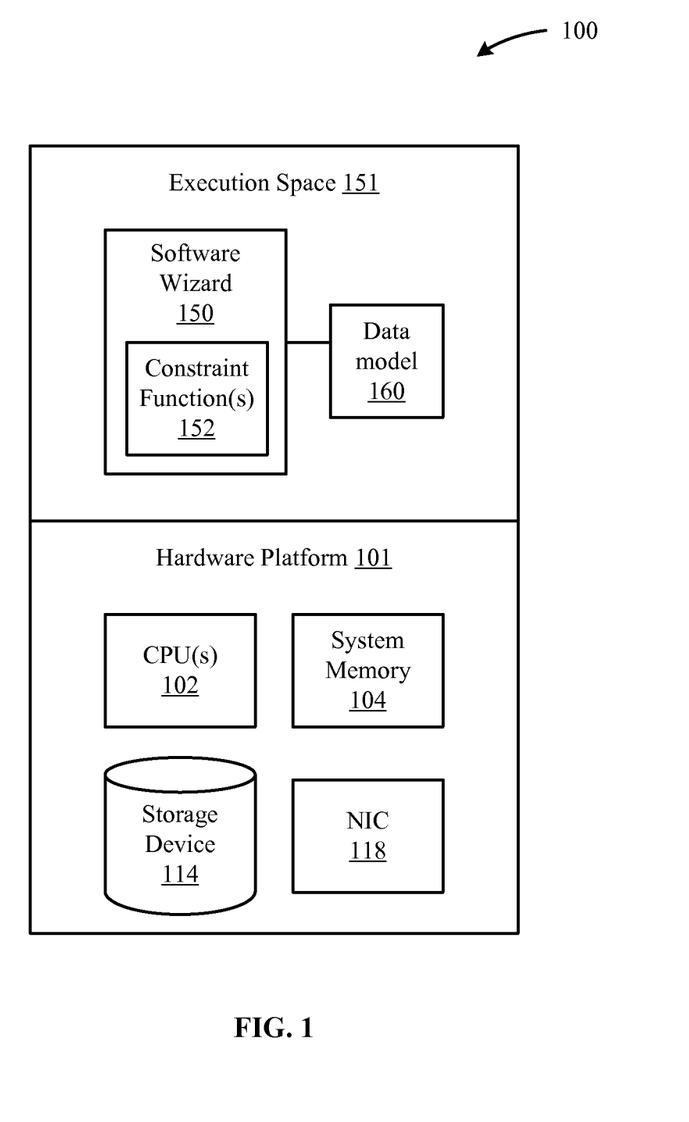
FIG. 1 is a block diagram of a computing device configured to implement one or more embodiments of the present invention.

FIG. 1 is a block diagram of a computing device configured to implement one or more embodiments of the present invention. Computing device 100 may be a computer workstation, personal computer, or any other device suitable for implementing a framework for developing software wizards that is described herein. It should be recognized that the computing device shown herein is illustrative and that variations and modifications are possible.

As shown, computing device 100 includes a hardware platform 101 that includes conventional components of a computing device, including as shown, one or more central processing units (CPUs) 102, system memory 104, local storage device 114 (e.g., hard disk drive), and a network interface controller (NIC) 118. Input/output devices (not shown) are also typically attached to computing device 100. Such input/output devices include a keyboard, a pointing device, and a display. FIG. 1 also conceptually illustrates an execution space 151 in which a software wizard 150 is executing. Software wizard 150 incorporates one or more constraint functions 152 that dictate the relationship between pages of software wizards. Data model 160 represents a data structure that stores data relied upon by constraint functions 152 to generate content for pages of the software wizards.

As will be described in further detail below, each constraint function is associated with at least one of three different types of inputs: user interface (UI) input elements, properties of the data model, and external data. Any time a change occurs to an input with which the constraint function is associated, the constraint function is triggered, and logic included therein is executed. For example, the constraint function may be triggered when the user manually interacts with the UI input element (e.g., selecting an item from a drop-down UI input element). In some instances, the constraint function may be triggered by another constraint function, e.g., when the execution of another constraint function changes values that are available for selection via the drop-down UI input element. A change to a property of the data model may also trigger the constraint function. For example, when the property of the data model takes on a value output by another constraint function, the constraint function may be triggered, as described in further detail below. Additionally, a change to the external data input of the constraint function may trigger the constraint function. One example of external data input is the automatic detection of the type of installer disc that is present in a CD-ROM or DVD-ROM drive, which could inform the software wizard of the type of guest OS that can be selected.

Each constraint function, in addition to being associated with at least one of three different types of inputs, is associated with at least one of four different types of output. The four different types of outputs include: validation, a set of values, data model properties, and page flow map changes. A "validation" output specifies any error messages that should be displayed to the user on a current page of the software wizard, and also enables the user to progress, or disables the user from progressing, to a next page of the software wizard. A "set of values" output specifies one or more values that should be presented to the user on the current or a future page of the software wizard, such as items in a drop-down from which the user is prompted to make a selection. A "data model property" output assigns a value to a particular property of the data model, where the value is obtained via one or more UI input elements and/or via logic included in the constraint function. Finally, a "page flow map change" output modifies one or more transitions between pages in the wizard to establish a particular flow of how the pages are presented to the user as he or she navigates throughout the software wizard.

Figure 2A:
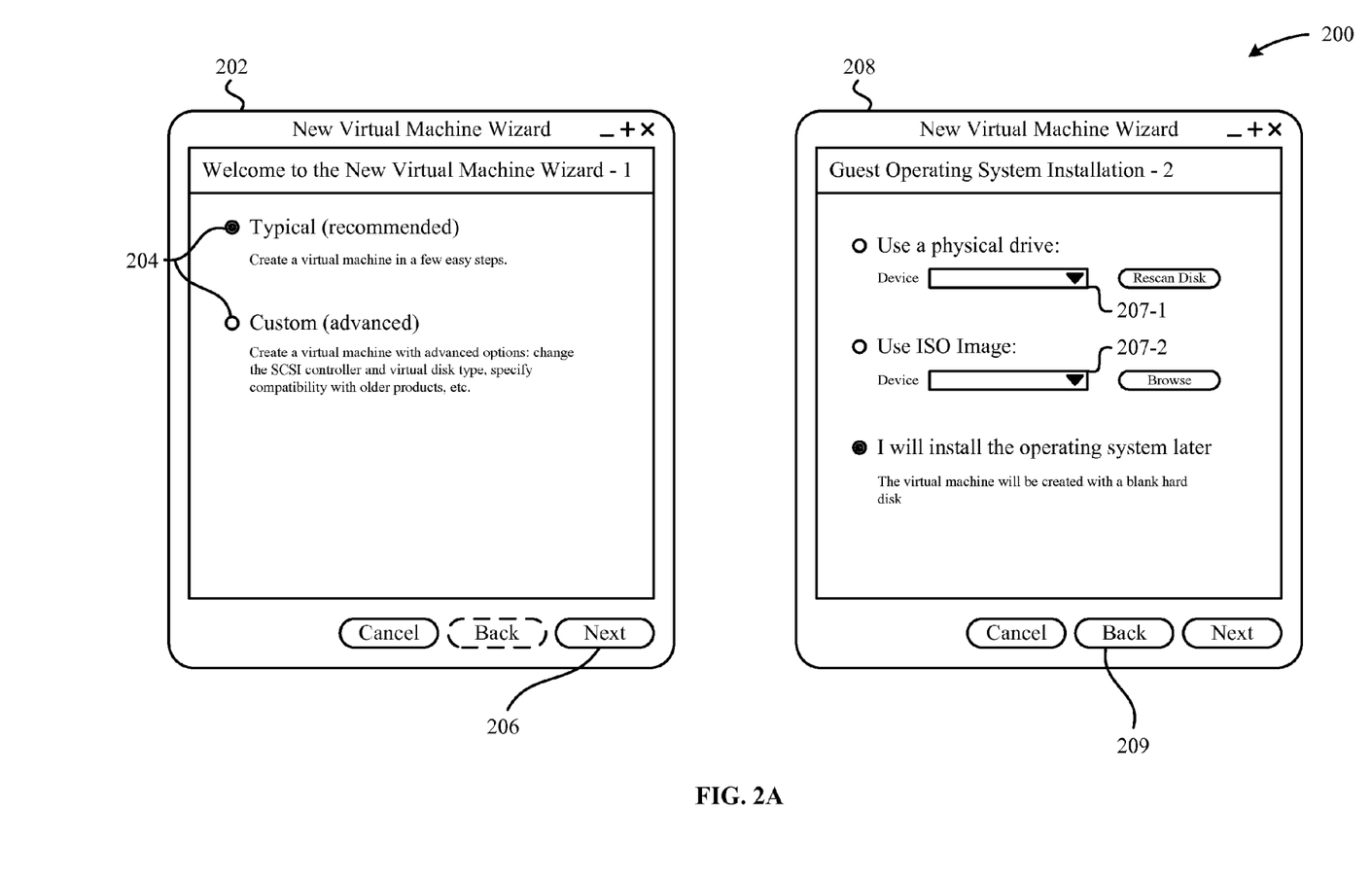
FIGS. 2A-2C illustrate pages of a software wizard, developed in accordance with one or more embodiments of the present invention, for configuring a virtual machine.
Figure 2B:
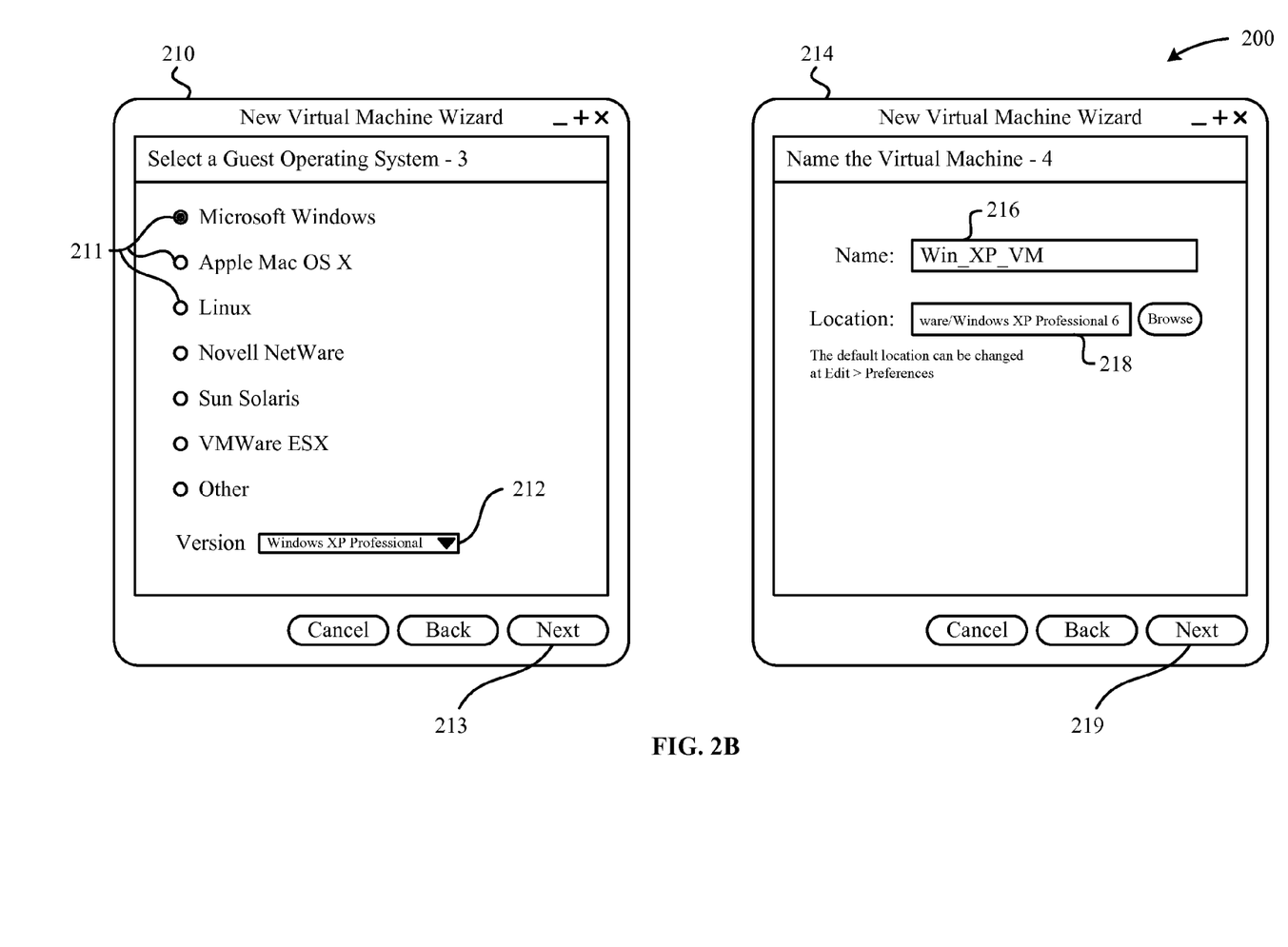
Figure 2C:
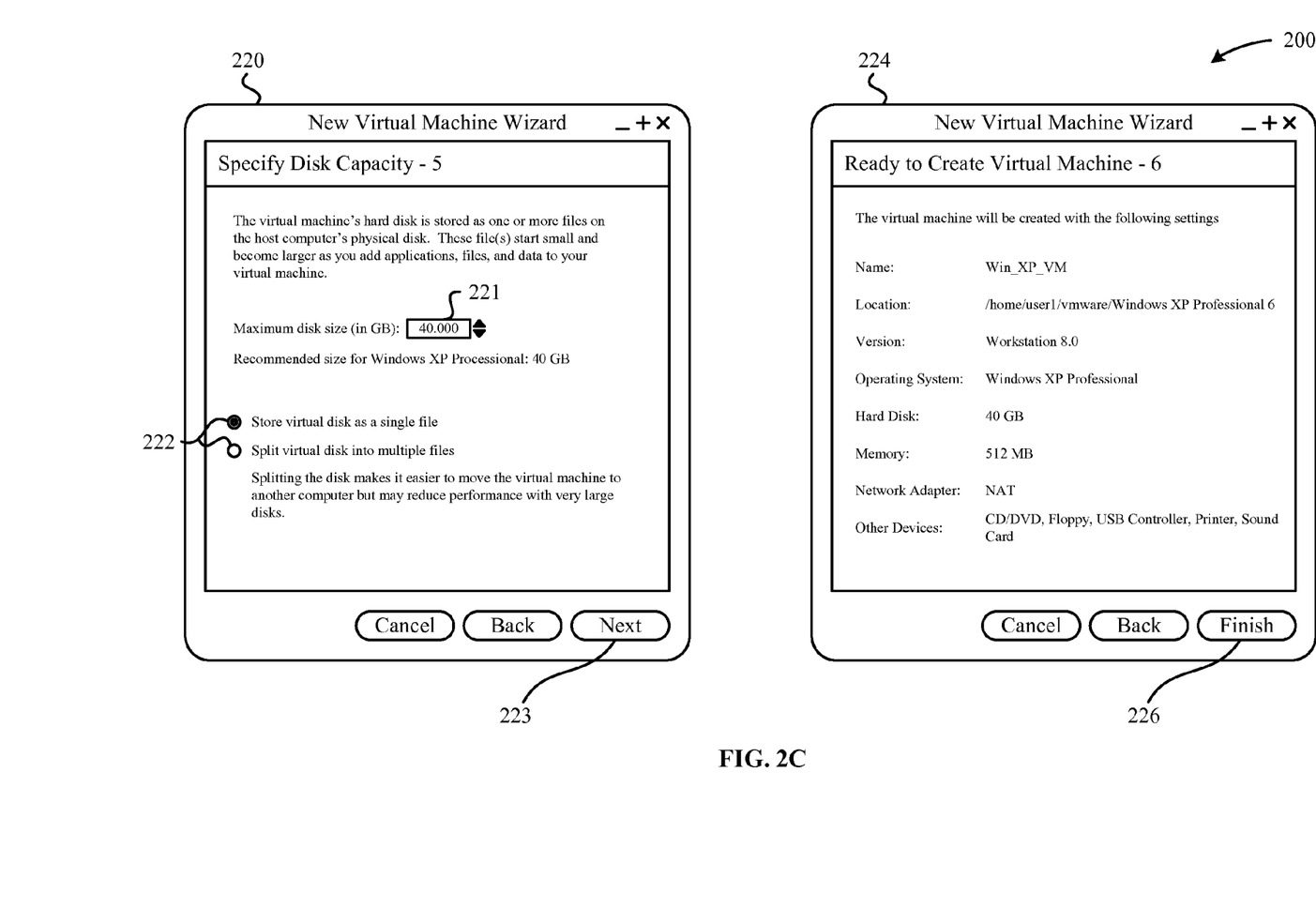

FIGS. 2A-2C illustrate pages of a software wizard 200, developed in accordance with one or more embodiments of the present invention, for configuring a virtual machine (VM). When software wizard 200 is executed successfully by a VM administrator (referred to below as the "user"), it instantiates an executing VM on a hardware platform.

As shown in FIG. 2A, software wizard 200 includes a first page 202 that prompts the user to make a selection between a "Typical (recommended)" or "Custom (advanced)" VM creation flow. To navigate to the next page of software wizard 200, the user first selects one of the radio buttons 204, and then clicks on a "Next" button 206. As shown, first page 202 also displays a "Cancel" button and a "Back" button. The "Back" button is, however, disabled because there is no previous page in software wizard 200 to which the user can navigate. In some embodiments, the "Next" button may be disabled on first page 202 or on any page of software wizard 200 if the user did not provide valid inputs.

A second page 208 represents the next page of software wizard 200 after first page 202 if the user selects the "Typical (recommended)" flow. In second page 208, a "Back" button 209 is now enabled, which allows the user to navigate back to first page 202 if, for example, the user changes his or her mind and now desires to configure a new VM according to the "Custom (advanced)" flow. Second page 208 prompts the user to designate the method of installing a guest operating system (OS) for the new VM. In the example illustrated in FIG. 2A, the user selects the option of installing the guest OS at a later time. However, if one of the other options is selected, then user would need to specify via drop-down 207-1 or 207-2, as the case may be, a physical drive or an ISO image, respectively, from which the guest OS is to be installed.

If the user clicks on the "Next" button at second page 208 after selecting the option of installing the guest OS at a later time, then software wizard 200 proceeds to a third page 210 shown in FIG. 2B. Third page 210 prompts the user to select, via radio buttons 211, a particular guest OS for installation in the VM. As also shown, the user is able to select, via a drop-down 212, a version of the guest OS selected via radio buttons 211. Each time the user selects a different guest OS, the content of drop-down 212 is updated by software wizard 200. In one example, if the user selects "Microsoft Windows," then the content of drop-down 212 is updated to include entries for "Microsoft Windows XP," "Microsoft Windows Vista," and "Microsoft Windows 7." A click on a "Next" button 213 transitions the software wizard to a fourth page 214.

Fourth page 214 prompts the user to specify a name for the VM via a text input box 216, and a path to a location where the VM is to be installed via a text input box 218. In some embodiments, software wizard 200 populates each of text input box 216 and text input box 218 automatically, according to inputs provided by the user at second page 208 and/or third page 210. In the example given herein, since the user specified at third page 210 "Windows XP Professional" as the version of the guest OS to be installed, then the VM name in text input box 216 is pre-populated by software wizard 200 with "Win_XP_VM."

When the user provides valid inputs at fourth page 214 and selects a "Next" button 219, then software wizard 200 transitions to a fifth page 220, which is illustrated in FIG. 2C. As shown, fifth page 220 prompts the user to specify a virtual disk size for the VM via a text input box 221 and, further, prompts the user to select, via radio buttons 222, whether to store the virtual disk as a single file or split the virtual disk into multiple files. A click on a "Next" button 223 causes software wizard 200 to transition to a sixth page 224.

Sixth page 224 displays a summary of configuration settings of the VM. As shown, the configuration settings reflect the various inputs and selections made by the user and stored in data model 160 as the user navigated through the pages of software wizard 200. In the example illustrated in FIGS. 2A-2C, sixth page 224 is the last page of software wizard 200. As a result, a "Next" button that appears in all prior pages is replaced with a "Finish" button 226. A click on "Finish" button 226 causes software wizard 200 to create the VM according to the various properties included in data model 160.

The pages of software wizard 200 shown in FIGS. 2A-2C illustrate the usefulness of a software wizard that has been developed and tested using constraint functions. The following description, in conjunction with FIGS. 3A-3B and FIGS. 4A-4B, set forth various examples of how constraint functions can be used to develop and test different software wizards, such as the software wizard illustrated in FIGS. 2A-2C. Additionally, various coding examples are provided to set forth an approach whereby the software wizard of FIGS. 2A-2C can be implemented according to the constraint functions described herein.

Figure 3A:
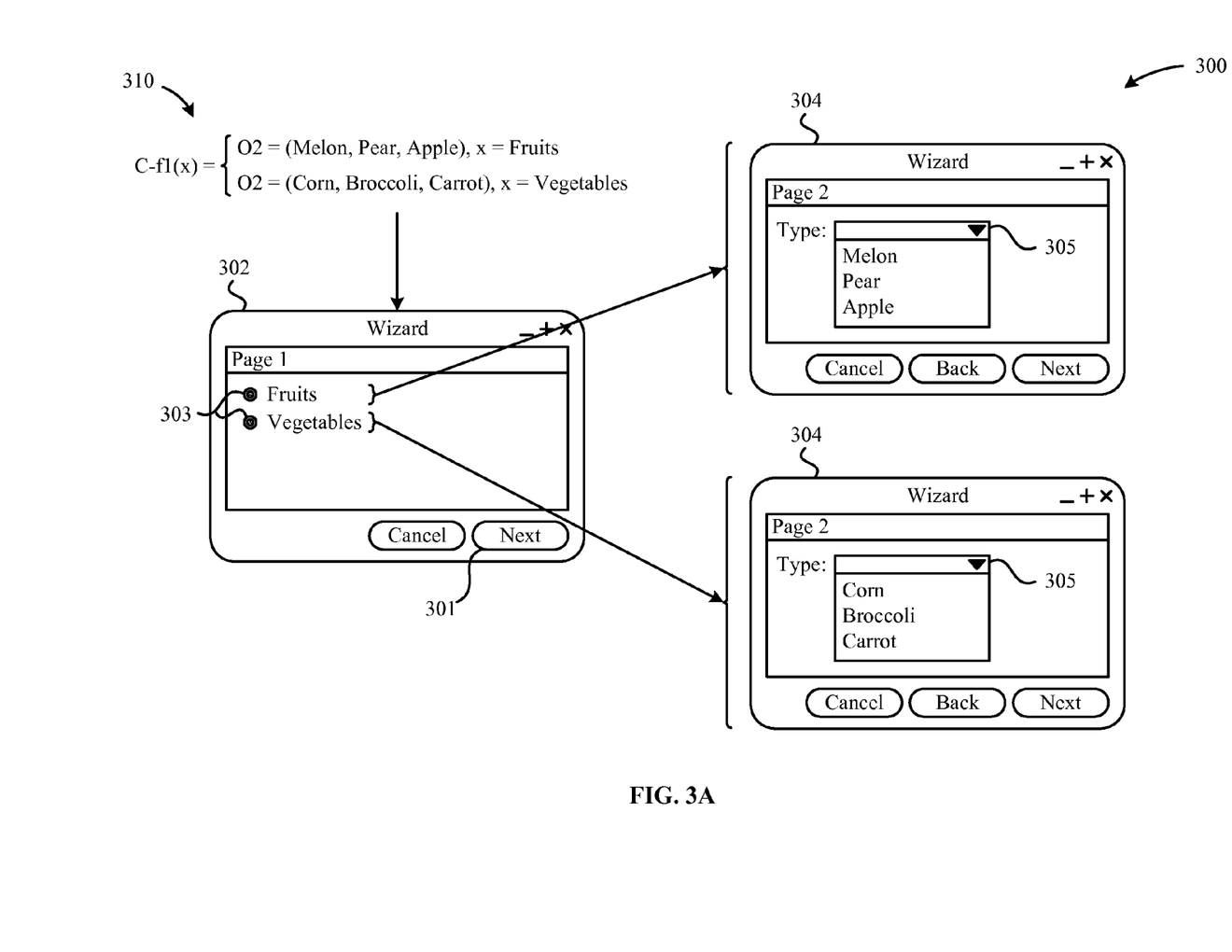
FIGS. 3A-3B are conceptual diagrams that illustrate software wizards that are developed using one or more constraint functions, according to an embodiment of the present invention.

One example of a software wizard that may be developed using constraint functions is illustrated in FIG. 3A. In this example, a constraint function 310 is represented as "C-f1 (x)" and is associated with only one of the three different types of constraint function inputs: a UI input element. In particular, constraint function 310 receives "x" (i.e., "Fruits" or "Vegetables") in response to input that is made at a first page 302 of software wizard 300 by a user via radio buttons 303. In response, constraint function 310 outputs, via execution of logic included therein, only one of the four different types of constraint function outputs: a set of values. Constraint function 310 outputs the set of values as "O2", and the values in "O2" are made available for selection by a user in page 304 of software wizard 300. When a "Next" button 301 is clicked on, software wizard 300 causes page 304 to be displayed. If radio button 303 selection is "Fruits," then constraint function 310 causes page 304 to populate a drop-down 305 with the set of values {Melon, Pear, Apple}. Conversely, if radio button 303 selection is "Vegetables," then constraint function 310 causes page 304 to populate drop-down 305 with the set of values {Corn, Broccoli, Carrot}.

If there are no overlaps in the fruit choices and the vegetable choices, constraint function 310 causes drop-down 305 to change its displayed item each time a user selects an item, navigates back to first page 302, changes the radio button selection, and then navigates forward to second page 304. On the other hand, if there are one or more overlaps, e.g., O2 for "x=Fruits" is {Melon, Pear, Apple, Tomato} and O2 for "x=Vegetables" is {Corn, Broccoli, Carrot, Tomato}, and the selected value (i.e., displayed item) is "Tomato", then constraint function 310 may not cause drop-down 305 to change its selected value when a user selects an item from drop-down 305, navigates back to first page 302, changes the radio button selection, and then navigates forward to page 304.

Figure 3B:
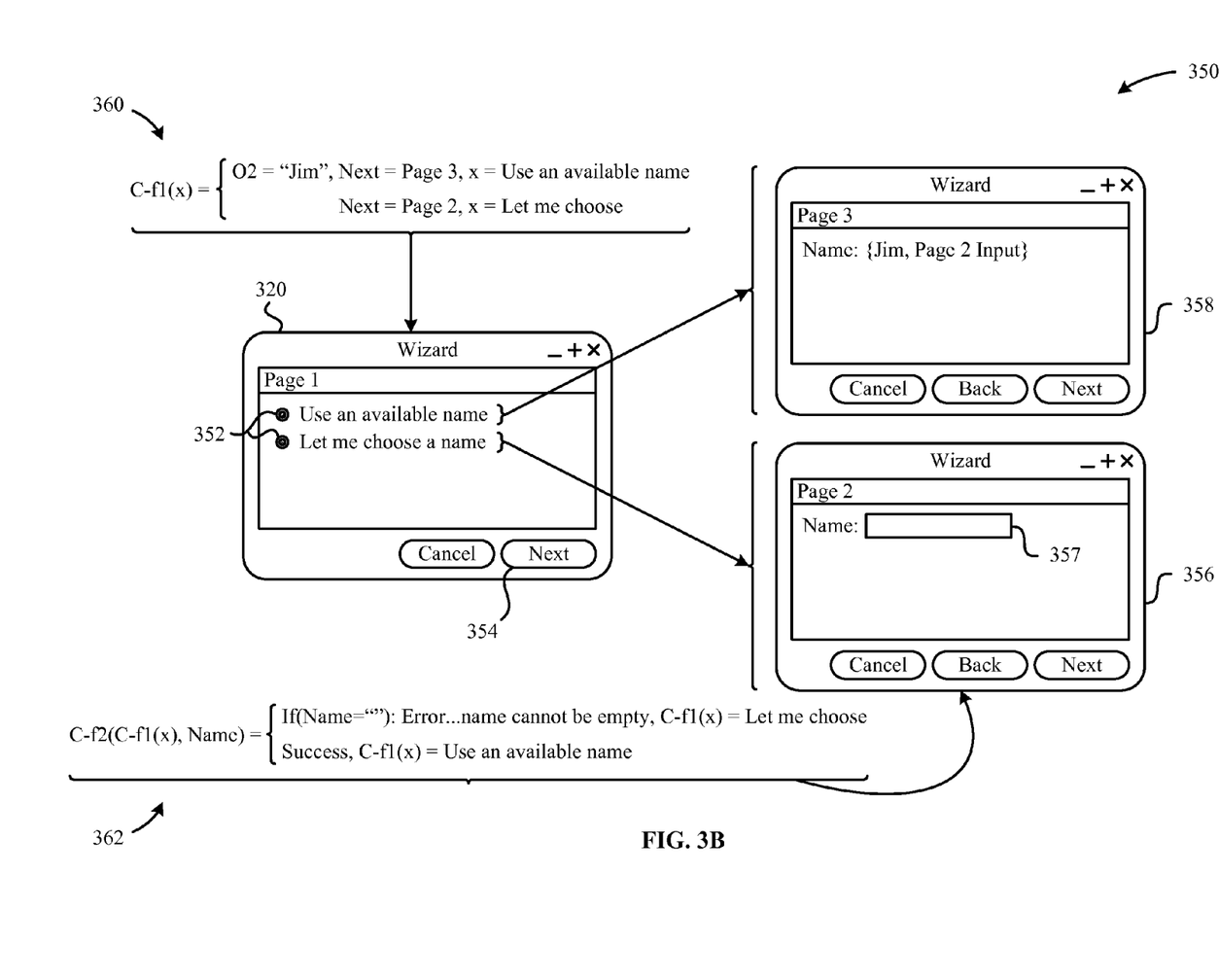

FIG. 3B illustrates another use of constraint functions. In this example, software wizard 350 is associated with both constraint function 360 (represented as "C-f1(x)") and constraint function 362 (represented as "C-f2(C-f1(x), Name)").

As shown, constraint function 360 is associated with only one of the three different types of constraint function inputs: a UI input element, which is tied to radio buttons 352. As also shown, constraint function 360 is associated with two of the four different types of constraint function outputs: set of values, and page flow map changes. Accordingly, when constraint function 360 is triggered by a radio button 352 selection, page transitions within software wizard 350 will be defined and, if upper radio button 352 is selected, "O2" is output by constraint function 360 as the value "Jim", which is assigned to a "Name" property of a data model associated with software wizard 350.

Constraint function 362 is associated with two of the three different types of constraint function inputs: a UI input element—which is tied to text input box 357, and a property of a data model—in particular, the "Name" property of the data model associated with software wizard 350, where the "Name" property is modified by constraint function 360 in response to user input at upper radio button 352 as described above. With respect to outputs, constraint function 362 is associated with only one of the four different types of constraint function outputs: validation. As shown, constraint function 362 includes validation logic that is executed when constraint function 362 is triggered.

For example, if the user selects the "Let me choose a name" option at first page 320 (i.e., "C-f1(x)=Let me choose"), and the user does not input a name into text input box 357, then an error message is displayed on second page 356 (i.e., "If (Name=''): Error . . . name cannot be empty"). In most cases, when a page of a software wizard is invalidated, any buttons included the page that would otherwise enable the user to proceed to a next page in the software wizard are disabled. Conversely, if the user selects the "Use an available name" option at first page 320, then constraint function 362 automatically validates the name "Jim" that is output by constraint function 360 and assigned to the "Name" of the data model with which the software wizard 350 is associated. Moreover, as described above, constraint function 362 is triggered any time a change is made to the text in text input box 357. Thus, constraint function 360 and constraint function 362 fully define how page transitions occur within software wizard 350 and ensure that a valid name is specified before a third page 358 is displayed to the user. As shown, third page 358 displays the name according to how the user interacted with software wizard 350, such that the available name (i.e., "Jim") or the name input by the user is displayed.

It should be recognized that comprehensive and automated testing of software wizards is achievable when constraint functions are used to develop software wizards. In particular, since constraint functions establish a more abstract relationship between inputs and outputs thereof, the constraint functions can be tested independently from the pages of the software wizard via a test harness that exercises the logic of the constraint functions. As a result, a software wizard developer, through testing the constrain functions, can effectively determine whether the software wizard executes as expected.

Figure 4A:
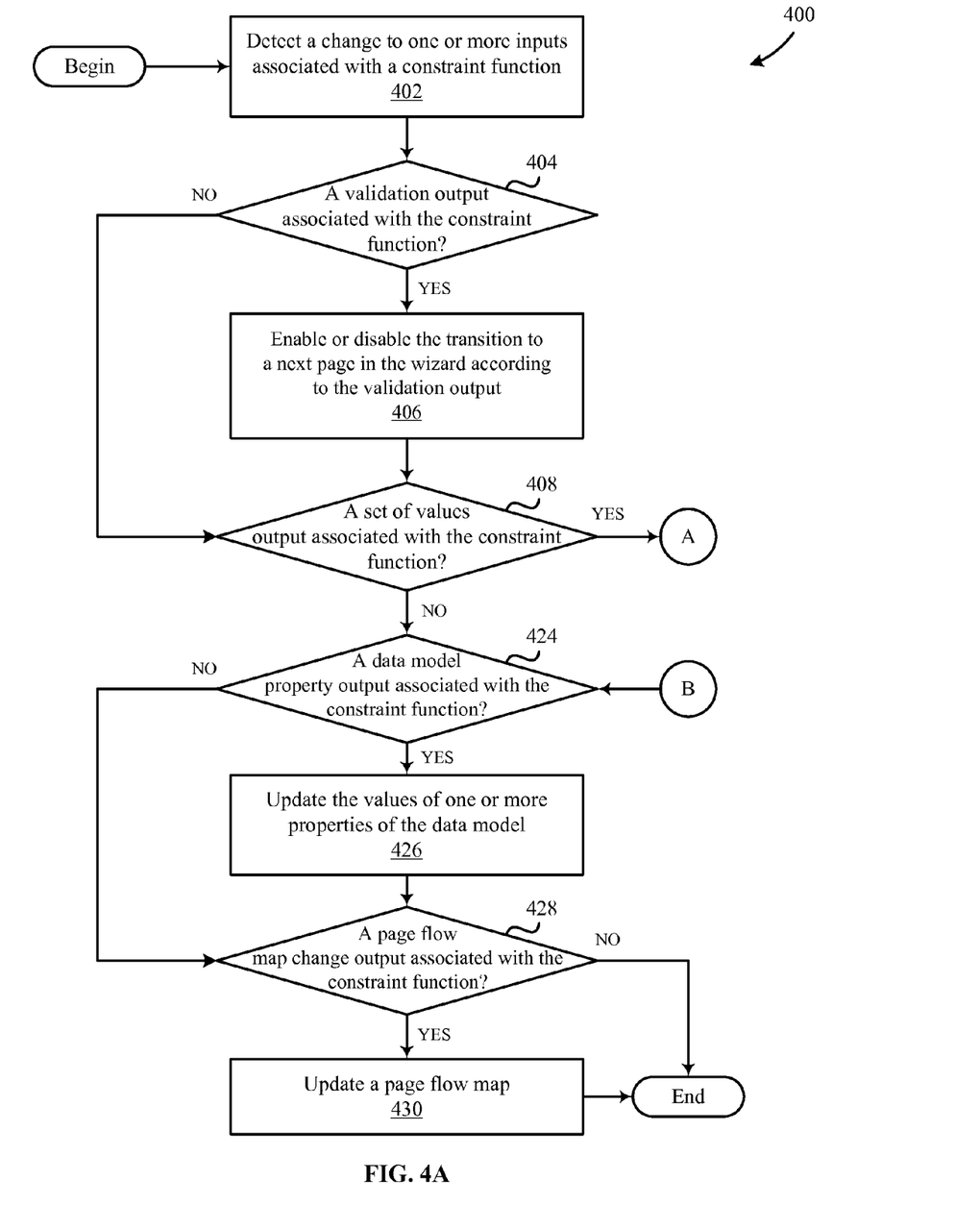
FIGS. 4A and 4B show a flow diagram that illustrates a method carried out by software wizard that uses constraint functions, according to one embodiment of the present invention.
Figure 4B:
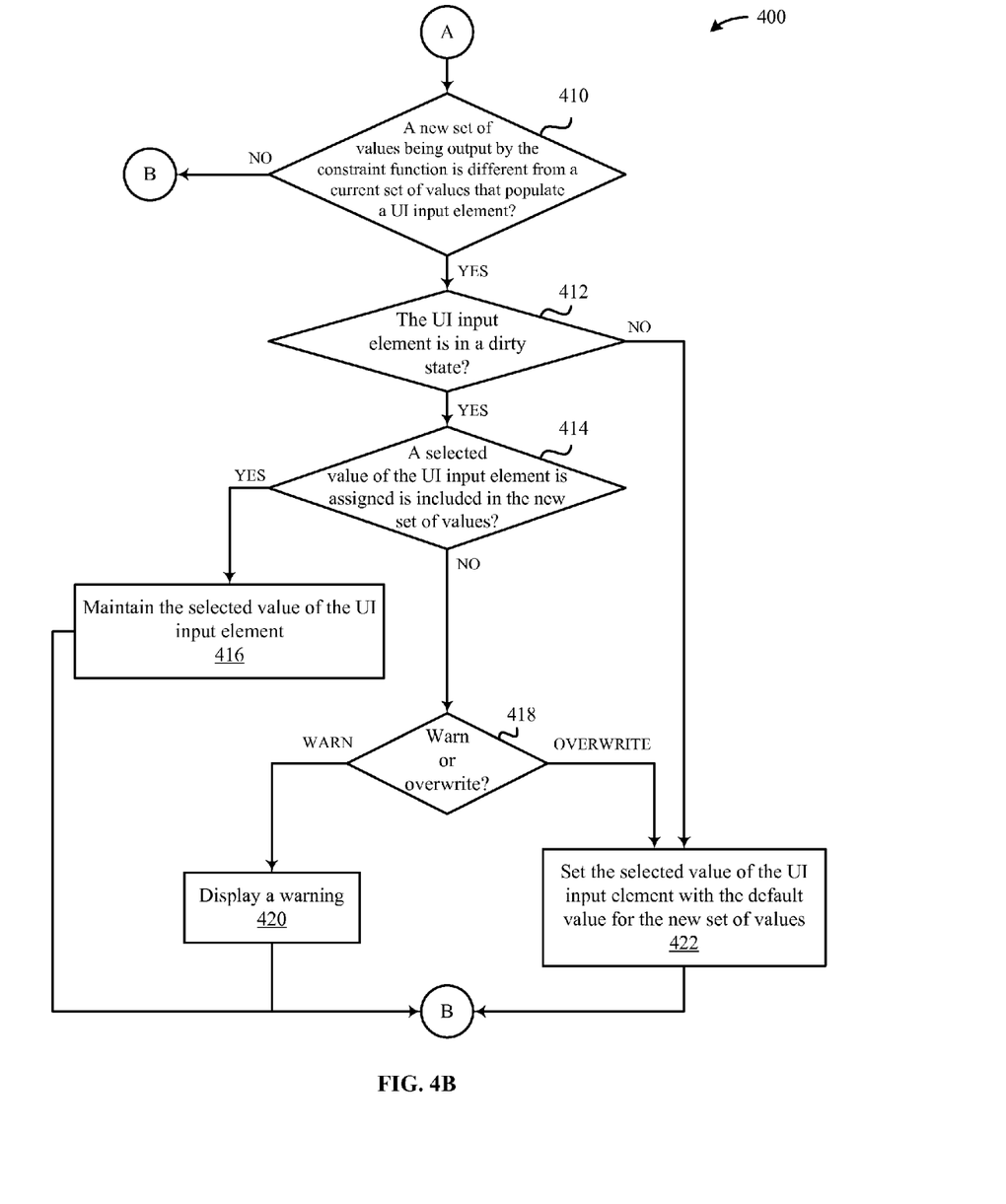

FIGS. 4A and 4B shows a flow diagram that illustrates a method carried out by a software wizard that uses constraint functions, according to one embodiment of the present invention. As shown, method 400 begins at step 402, where the software wizard (e.g., software wizard 150) detects a change to one or more inputs associated with a constraint function. A user selection of either the "Fruits" or "Vegetables" option illustrated in FIG. 3A would be one example of such a change. When the change is detected, logic included in the constraint function is executed. The flow of execution passes through decision blocks 404, 408, 424, and 428, each of which tests for the presence of a particular type of constraint function output. Decision block 404 tests for the presence of a validation output. Decision block 408 tests for the presence of a "set of values" output. Decision block 424 tests for the presence of a data model property output. Decision block 428 tests for the presence of a page flow map change.

At decision block 404, the software wizard determines whether there is a validation output associated with the constraint function. If so, step 406 is executed, where the software wizard, according to the validation output, enables or disables the transition to a next page in the software wizard. For example a "Next" button included in the current page of the software wizard may be disabled to prevent the user from moving forward in the software wizard if an invalid input is made by the user.

If, at decision block 404, the software wizard determines that there is no validation output associated with the constraint function, then method 400 proceeds to decision block 408, where the software wizard determines whether there is a "set of values" output for populating a UI element, that is associated with the constraint function. If so, one or more of steps 410, 412, 414, 416, 418, 420, and 422 are carried out before returning to decision block 424.

At step 410, the software wizard determines whether the "set of values" output by the constraint function is different from a set of values, if any, that was previously output by the constraint function to populate the UI input element. In the example given above in conjunction with FIG. 3A, when the user first selects "Fruits" on the first page 302 of software wizard 300, this causes the constraint function 310 to output the set of values {Melon, Pear, Apple, Tomato} to populate drop-down 305 included in the page 304. During this initial selection, there would be no set of values previously output by the constraint function, and thus method 400 would return to step 424. If, however, the user comes back to this page and selects "Vegetables," this would cause the constraint function 310 to output the set of values {Corn, Broccoli, Carrot, Tomato}, which is different from the set of values that previously output, and cause method 400 to proceed to step 412.

At step 412, the software wizard determines whether or not the UI input element is in a "dirty" state. In general, a UI input element attains such a "dirty" state when a user has previously made an input using that UI input element. For example, drop-down 305 would attain a "dirty" state if the user makes a selection of one of the values populated into drop-down 305. If, at step 412, the software wizard determines that the UI input element is not in a "dirty" state, then method 400 proceeds to step 422, where the software wizard sets the selected value of the UI input element with one of the values in the "set of values" output that has been designated as the default value. In one implementation, the first item in "set of values" is designated as the default value. As described herein, updating the UI input element, as in step 422, may trigger the additional constraint functions to execute, which would cause the method steps 400 to be executed for each additional constraint function under the context of that constraint function. Method 400 then returns to step 424.

If, at step 412, the software wizard determines that the UI input element is in a "dirty" state, step 414 is executed. At step 414, the software wizard determines whether the selected value of the UI input element (i.e., the selected value that caused the UI input element to be "dirty") is included in the "set of values" output. If so, the software wizard maintains the selected value of the UI input element (step 416) and method 400 returns to step 424. It should be recognized that maintaining the selected value honors the prior selection made by the user. The only condition is that the selected value be included in the "set of values" output, which was the test carried out at step 414.

If, at step 414, the software wizard determines that the selected value of the UI input element is not included in the "set of values" output, step 418 is executed. At step 418, the software wizard determines, according to a configuration setting in the software wizard, whether to warn the user that his or her prior selection is about to be modified (in which case step 420 is executed next and a warning message is displayed), or to override the prior selection (in which case step 422, which is described above) is executed next.

At decision block 424, the software wizard determines whether there is a data model property output associated with the constraint function. One example of a data model property output may be a value for a variable that is used subsequently by the software wizard. If there is a data model property output associated with the constraint function, step 426 is executed, where the software wizard updates the data model properties according to the output. Again, such an update to the data model property may trigger additional constraint functions to execute, as described above at step 422. Otherwise, method 400 proceeds to decision block 428.

At decision block 428, the software wizard determines whether there is a page flow map change output associated with the constraint function. If there is a page flow map change output associated with the constraint function, step 430 is executed, where the software wizard updates a page flow map that is used by the software wizard to transition between pages. If there no page flow map change output associated with the constraint function, method 400 terminates.

In one embodiment, the page flow map is implemented by associating each page in the software wizard with a unique identifier (ID), and further associating each page in the software wizard with a next page that the software wizard should display to the user when the user has completed his or input to the page and clicks on the "Next" button. In the example of the software wizard 350 shown in FIG. 3B, if first page 320 is associated with an ID of 1, second page 356 with an ID of 2, and third page 358 with an ID of 3, the page flow map associated with the software wizard 350 would show 1→2 to indicate a transition from first page 320 to second page 356 or 1→3 to indicate a transition from first page 320 to third page 358.

The following Tables 1-6 include C++ code segments that set forth partial examples of various classes for implementing various features of the present invention described above. In one embodiment, each property of data model 160 is structured according to Table 1 listed below. In Table 1, a property is a data component that has associated therewith "get" and "set" operations, as well as a "changed" signal. The property can be set using the "Set( )" method, assignment operators, or by connecting to a "setter slot," which is a functor that sets the value for the property. The value of the property can be retrieved using the "Get( )" method, a "getter slot," or via implicit or explicit casting. The "willChange" signal is fired before a change is made to the actual value (and only if the new value is different from the old). The "changed" signal is fired after a change is made to the value.

TABLE 1

```
template<typename T>
class Property
{
public:
    typedef T ValueType;
    typedef sigc::slot<void, const T&> SetterSlot;
    typedef sigc::slot<T> GetterSlot;
    Property( );
    Property(const T& defaultValue, bool isMutable=true);
    Property(GetterSlot getter, sigc::signal<void>& changedSignal,
        bool isMutable=false);
    virtual ~Property( );
    // Set/Get methods
    virtual void Set(const T& value);
    virtual const ValueType& Get( ) const;
    // Assignment operators
    Property<T>& operator=(const T& value);
    Property<T>& operator=(const Property<T>& property);
    // Comparison operators
    bool operator==(const T& value);
    bool operator!=(const Property<T>& property);
    // Conversion operators
    operator T( ) const;
    // Slot-related functions
    SetterSlot MakeSetterSlot( );
    GetterSlot MakeGetterSlot( ) const;
    // Signals
    mutable sigc::signal<void> willChange;
    mutable sigc::signal<void> changed;
    // Data binding
    template<typename U>
    void Bind(U& obj);
    sigc::connection Bind(SetterSlot setterSlot);
    sigc::connection Bind(sigc::signal<void>& signal, GetterSlot
        getterSlot);
    sigc::connection Bind(Glib::SignalProxy0<void> signal, GetterSlot
        getterSlot);
protected:
    T mValue;
};
```

Example code for data model 160 is included in Table 2 listed below. For example, in Table 2, there is a "guestFamily" property that is assigned an operating system type (e.g., "Microsoft Windows") based on input made by the user via radio buttons 211 included in third page 210 of the software wizard. Similarly, Table 2 includes a "guestType" property (i.e., "Windows XP Professional", a "diskSize" property (i.e., 40 GB), and a "name" property (i.e., "Win_XP_VM").

TABLE 2

```
class DataModel
{
public:
    DataModel( );
    Property<utf::string> guestFamily;
    Property<utf::string> guestType;
    Property<unsigned int> diskSize;
    Property<utf::string> name;
    ...
};
```

Example code for a page flow map that defines page flows within software wizard 200 is included in Table 3 listed below. In Table 3, each source page is mapped to a destination. The source page is a unique key in a map, meaning that each page can only have a single destination. In Table 3, each page ID corresponds to the various pages of software wizard 200, i.e., WELCOME corresponds to first page 202, PHYSICAL_ISO_LATER corresponds to second page 208, GUEST_OS_FAMILY corresponds to third page 210, NAME_AND_LOCATION corresponds to fourth page 214, DISK_SIZE corresponds to fifth page 220, and SUMMARY corresponds to sixth page 224. This page map is continually updated by constraint functions based on inputs made by the user when interacting with pages of the software wizard, the details of which are described below in conjunction with Table 5.

TABLE 3

```
enum PageID {
   WELCOME,
   PHYSICAL_ISO_LATER,
   GUEST_OS_FAMILY,
   NAME_AND_LOCATION,
   DISK_SIZE,
   SUMMARY,
};
class PageFlow
   : public std::map<PageID, PageID>
{
public:
   PageFlow( );
   ~PageFlow( );
   sigc::slot<void, PageID, PageID> MakeSetterSlot( );
};
```

In one embodiment, constraint functions of a software wizard are defined according to Table 4 listed below. In Table 4, a constraint function is a generic type that can be extended. In accordance with the descriptions provided in conjunction with FIGS. 3A-3B, each constraint function is associated with at least one of the three different constraint function inputs, and is further associated with at least one of the four different constraint function outputs. If any of the input properties change, the "Evaluate( )" method is triggered, which includes logic that is executed.

TABLE 4

```
class Constraint
{
public:
   Constraint( );
   virtual ~Constraint( );
protected:
   virtual void Evaluate( );
};
```

Example code for a constraint function that corresponds to first page 202 is included Table 5 listed below.

TABLE 5

```
class TypicalCustomConstraint
   : public Constraint
{
public:
   TypicalCustomConstraint(GUIPage& page, PageFlow& pages,
      DataModel& model);
   virtual ~TypicalCustomConstraint( );
/**** Inputs ****/
   // Data input for the typical/custom radio button. true=typical,
   false=custom
   Property<bool> typicalRadio;
/**** Outputs ****/
   // Page flow output
   Property<std::pair<PageID /* source */, PageID /* destination */> >
```

TABLE 5-continued

```
   flow;
protected:
   virtual void Evaluate( );
};
TypicalCustomConstraint::TypicalCustomConstraint(GUIPage& page,
                              PageFlow& pages,
                              DataModel& model)
{
   // Bind the input parameter to the data input on the page, trigger
   // Evaluation when the input parameter changes
   typicalRadio.Bind(page.radioButton);
   typicalRadio.changed.connect(
      sigc::mem_fun(this, &TypicalCustomConstraint::Evaluate));
   // Connect the output parameter to the page flow map
   flow.changed.connect(sigc::compose(
      pages.MakeSetterSlot( ),
      flow.MakeGetterSlot( )));
}
void
TypicalCustomConstraint::Evaluate( )
{
   //"Evaluate" reads from input properties and writes to output properties.
   if (typicalRadio == true) {
      flow.Set(std::make_pair(WELCOME, GUEST_OS));
   } else {
      flow.Set(std::make_pair(WELCOME, GUEST_OS_CUSTOM));
   }
}
```

In this code example, "page.RadioButton" refers to radio button 204 for the "Typical (recommended)" option. In this way, any change to radio buttons 204 on the second page 202 causes the "Evaluate( )" method to execute. As a result, the page flow map is updated according to the choice made by the user (i.e., "Typical (recommended)" or "Custom (advanced)"), such that clicking the "Next" button causes software wizard 200 to transition to the second page 208 or a different page (not illustrated in the Figures) to enable the user to perform a custom installation of the new VM.

Example code for a constraint function that is executed when the user chooses a guest OS family via radio buttons 211 in third page 210 (e.g., "Microsoft Windows", "Apple Mac OS X", etc.) is included below in Table 6 listed below.

TABLE 6

```
class OSFamilyConstraint
   : public Constraint
{
public:
   OSFamilyConstraint( );
   virtual ~OSFamilyConstraint(GUIPage& page,
                        PageFlow& pages,
                        DataModel& model);
/**** Inputs ****/
   // Data input from the "Family" radio button
   Property<utf::string> guestFamily;
/**** Outputs ****/
   // Set-of-values for the "Version" drop-down box
   Property<std::list<utf::string> > guestVersions;
   Property<utf::string> defaultGuestVersion;
   // Data model output
   Property<utf::string> guestFamilyOut;
protected:
   std::map<utf::string /* family */,
      std::list<utf::string> /* versions */> mGuestOSTable;
   std::map<utf::string /* family */,
      utf::string /* version */> mDefaultVersions;
   virtual void Evaluate( );
};
OSFamilyConstraint::OSFamilyConstraint(GUIPage& page,
                        PageFlow& pages,
                        DataModel& model)
{
   // Bind the input parameter to the data input on the page, trigger
```

TABLE 6-continued

```
// evaluation when the input parameter changes
guestFamily.bind(page.familyRadio);
guestFamily.changed.connect(
    sigc::mem_fun(this, &OSFamilyConstraint::Evaluate));
// Connect the guestFamilyOut output parameter to the data model
guestFamilyOut.changed.connect(sigc::compose(
    model.guestFamily.MakeSetterSlot( ),
    guestFamilytOut.MakeGetterSlot( )));
// Connect the guestVersions output parameters to another data input.
// SetPossibleValues( ) takes a list of possible values and a default
value.
    guestVersions.changed.connect(sigc::compose(
        sigc::mem_fun(page.guestTypesDropDownMenu,
&DropDownMenuInput::SetPossibleValues),
        guestVersions.MakeGetterSlot( ),
        defaultGuestVersion.MakeGetterSlot( )));
}
void
OSFamilyConstraint::Evaluate( )
{
    /*
    * "Evaluate" reads from input properties and writes to output
    * properties.
    * This looks up the family inside a "guest OS table" (that maps
    * families to versions) and writes the list of possible versions out to
    * guestVersions and defaultGuestVersion.
    *
    * It also copies the selected family into the data model output.
    */
    utf::string family = guestFamily.Get( );
    guestVersions.Set(mGuestOSTable[family]);
    defaultGuestVersion.Set(mDefaultVersions[family]);
    guestFamilyOut.Set(family);
}
```

Embodiments of the present invention provide various advantages over conventional approaches that are typically used to implement software wizards. The data model and the constraint function(s) described herein create a self-documenting representation of how user input decisions influence the overall behavior of a software wizard. The data model and the constraint function(s) can be used to unify logic across all pages included in the software wizard, even those pages that never end up being displayed to the user, since any constraint function(s) associated with those pages are still evaluated. The data model and the constraint function(s) also support non-linear page flow as part of the design of the software wizard. The data model and the constraint function(s) further allow the user to modify prior data input(s) and/or selections without referencing any data other data that is not influenced by the data input and/or selections, which increases overall efficiency and simplifies testing of the software wizard.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of generating and testing a sequence of user interface (UI) pages of a software wizard, comprising the steps of:

generating UI pages of the software wizard that includes a first UI page and other UI pages of the software wizard, wherein the first UI page is associated with one or more constraint functions which, when triggered, cause a transition from the first UI page to another UI page of the software wizard; and testing the constraint functions independently of the UI pages of the software wizard to determine that the software wizard executes as expected, wherein inputs to the constraint functions include UI input elements, properties of a data structure that stores data relied upon by the constraint functions to generate content for the UI pages of the software wizard, and external data, and outputs of the constraint functions include validation results, a set of values to be presented on one or more of the UI pages of the software wizard, a value to be assigned to a particular property of the data structure, and a page flow map change that modifies one or more transitions between the UI pages of the software wizard, and wherein the constraint functions include a first constraint function, a second constraint function, and a third constraint function, the output of the first constraint function including a value for a particular property of the data structure, that is an input to the second constraint function and triggers the second constraint function, and wherein an input of the third constraint function is a UI input element and a validation result of the third constraint function is an error message that causes the UI input element to be disabled.

2. The method of claim 1, wherein testing the constraint functions comprises causing a change to a UI input element associated with the first UI page.

3. The method of claim 2, wherein the change to the UI input element includes populating the UI input element with one or more values.

4. The method of claim 1, wherein testing the constraint functions comprises causing a change to a property of a data model for at least one constraint function, where said change is caused by another constraint function.

5. A non-transitory computer readable storage medium comprising instructions that, when executed by a processor, cause the processor to generate and test a sequence of user interface (UI) pages of a software wizard, by performing the steps of:

generating UI pages of the software wizard that includes a first UI page and other UI pages of the software wizard, wherein the first UI page is associated with one or more constraint functions which, when triggered, cause a transition from the first UI page to another UI page of the software wizard; and testing the constraint functions independently of the UI pages of the software wizard to determine that the software wizard executes as expected, wherein inputs to the constraint functions include UI input elements, properties of a data structure that stores data relied upon by the constraint functions to generate content for the UI pages of the software wizard, and external data, and outputs of the constraint functions include validation results, a set of values to be presented on one or more of the UI pages of the software wizard, a value to be assigned to a particular property of the data structure, and a page flow map change that modifies one or more transitions between the UI pages of the software wizard, and wherein the constraint functions include a first constraint function, a second constraint function, and a third constraint function, the output of the first constraint function including a value for a particular property of the data structure, that is an input to the second constraint function and triggers the second constraint function, and wherein an input of the third constraint function is a UI input element and a validation result of the third constraint function is an error message that causes the UI input element to be disabled.

6. The non-transitory computer readable storage medium of claim 5, wherein testing the constraint functions comprises causing a change to a UI input element associated with the first UI page.

7. The non-transitory computer readable storage medium of claim 6, wherein the change to the UI input element includes populating the UI input element with one or more values.

8. The non-transitory computer readable storage medium of claim 5, wherein testing the constraint functions comprises causing a change to a property of a data model for at least one constraint function, where said change is caused by another constraint function.

* * * * *